United States Patent

Horrobin et al.

[15] 3,642,309
[45] Feb. 15, 1972

[54] COUPLINGS

[72] Inventors: Gerald V. Horrobin, Halesowen; John F. Hutton, Crowthorne; Peter M. Knowles, Kidderminster, all of England

[73] Assignee: Henry Beakbane (Fortox) Limited, Kidderminster, Worcester, England

[22] Filed: Feb. 2, 1970

[21] Appl. No.: 7,782

[52] U.S. Cl..............................285/226, 285/260, 285/399
[51] Int. Cl.........................................................F16l 21/00
[58] Field of Search..................285/260, 399, 401, 390, 391, 285/376, 355, 226, 424, 286, 416, 209; 138/121

[56] References Cited

UNITED STATES PATENTS

| | | | |
|---|---|---|---|
| 1,777,977 | 10/1930 | Lente | 285/355 X |
| 3,248,129 | 4/1966 | Brown | 285/396 X |
| 3,284,264 | 11/1966 | O'Rourke | 285/226 X |
| 1,062,635 | 5/1913 | Clements | 285/209 X |
| 3,477,745 | 11/1969 | Williams et al. | 285/390 X |

FOREIGN PATENTS OR APPLICATIONS

| | | | |
|---|---|---|---|
| 615,054 | 6/1935 | Germany | 285/390 |

*Primary Examiner*—Dave W. Arola
*Attorney*—Woodling, Krost, Granger & Rust

[57] ABSTRACT

A corrugated cover is made up of a number of sections each formed from annular elements. An end element of a section is formed with a radial slot which extends inwardly from the outer periphery thereof and the other end element has a radial slot which extends outwardly from the inner periphery thereof. This slot arrangement permits rapid coupling together of the sections.

3 Claims, 2 Drawing Figures

PATENTED FEB 15 1972 3,642,309

COUPLINGS

BACKGROUND OF THE INVENTION

1. Field of the Invention

This invention relates to couplings and, more specifically, it relates to coupling together sections of corrugated covers used to protect the reciprocating parts of machinery.

2. Description of the Prior Art

The end elements of adjacent sections of corrugated covers have previously been connected by sewing, gluing or clamping. These previous processes have been laborious and time consuming and it is an object of the present invention to simplify connection of the end elements.

SUMMARY OF THE INVENTION

A corrugated cover section has end elements of annular form which are provided with radial slits.

DESCRIPTION OF THE PREFERRED EMBODIMENTS

Figure 1:
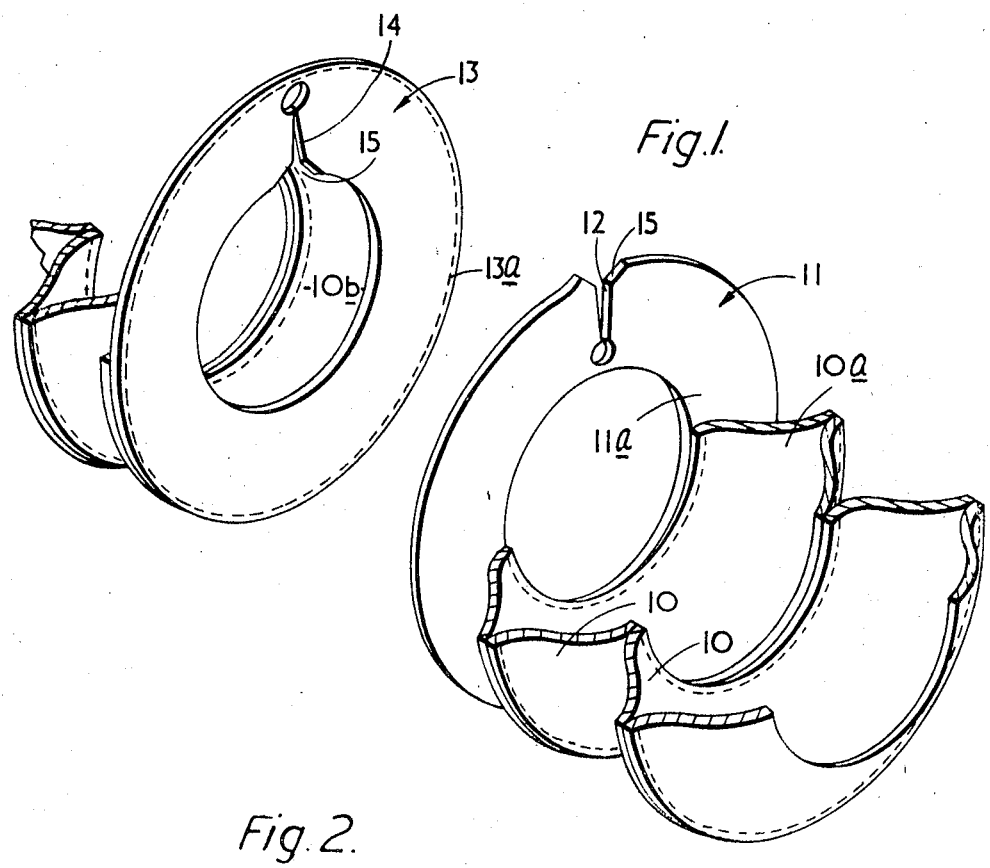
FIG. 1 is a partly broken-away perspective view of the ends of a pair of sections of a corrugated cover, said sections being arranged to be coupled together.

Each section of the corrugated cover shown in FIG. 1 consists of a plurality of annuli 10 secured together by alternately sewing together the inner and outer peripheries of the annuli so that a concertina is obtained. At one end of each section of the cover an annular end member 11 having an outwardly directed radial slot 12 is provided and at the other end of each section an annular end member 13 having an inwardly directed radial slot 14 is provided. Each slot is formed with a diverging mouth 15 to provide a lead-in.

The end member 11 is secured to its adjacent annulus 10a around its inner periphery 11a and the end member 13 is secured to its adjacent annulus 10b around its outer periphery 13a so that the end members at the adjacent ends of a pair of sections can be used to couple the two sections of the cover together. To do this the two end members 11 and 13 are placed in face-to-face relationship with the slots 12 and 14 therein spaced apart by a small angular spacing of the order of say 10° to 30°. One or both of the annular end members 11 and 13 is then deformed in the vicinity of its slot 12 or 14 so that a part of each member 11 or 13 passes through the slot 14 or 12 formed in the other annular end member 13 or 11. The two sections of the cover are then rotated relative to each other so that, in effect, each annular end member 11 or 13 passes completely through the slot 14 or 12 formed in the other and a condition is obtained in which the two end members 11 and 13 are disposed in back-to-back relationship with each disposed between the other and the adjacent annulus of the section associated with the other, i.e., the end member 13 is between the annulus 10a and the end member 11, member 11 being adjacent annulus 11a.

The above-described coupling method can be applied not only to connecting together adjacent sections of a cover, but also to connecting attachments to sections of a cover.

Figure 2:
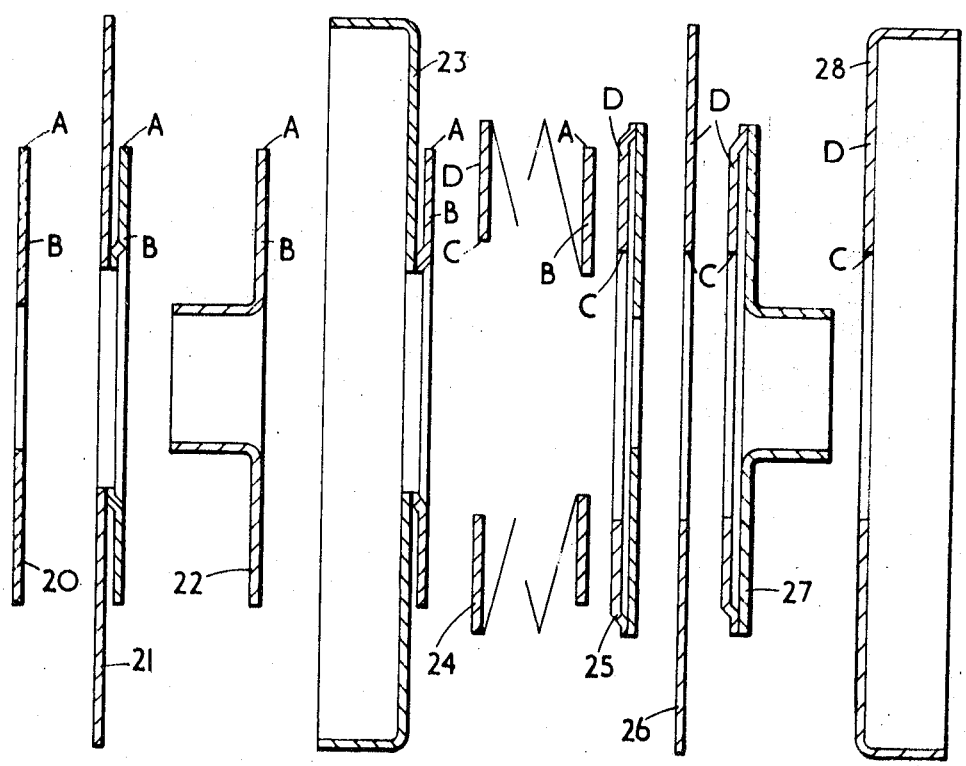
FIG. 2 is a sectional view of a number of components which can be incorporated in the corrugated cover.

FIG. 2 illustrates a number of other components which can be incorporated in a concertina-type cover, the components either being formed with radially outwardly directed slots extending between the positions indicated by the letters A and B or with radially inwardly directed slots which extend between the positions indicated by the letters C and D. The components illustrated in FIG. 2 are a member 20 which affords an inwardly directed flange, a member 21 which affords an outwardly directed flange, a member 22 which affords an internal collar, a member 23 which affords an external collar, an adapter 24 for interconnecting bellows sections of different sizes, an internal flange-providing member 25, an outward flange-providing member 26, a member 27 which affords an internal collar and a member 28 which affords an external collar. The members 20 to 24 are formed with radially outwardly extending slots and the members 24 to 28 are formed with radially inwardly extending slots.

The coupling members 11 and 13 and the annuli 10 forming the cover and the components 20 to 28 for inclusion in the cover are conveniently all formed of synthetic plastics material. The annuli 10 are preferably formed of the synthetic plastics material sold under the Registered Trademark "TERYLENE" and the coupling members 11 and 13 and the components 20 to 28 are formed of a plastics material more rigid than that of which the annuli 10 are formed. The more rigid plastics material may be either polyethylene or polypropylene.

The components 20 to 28 illustrated in FIG. 2 are of conventional form, i.e., those which are normally used with concertina-type covers and an important advantage of the present invention is that, not only does it enable rapid connection of sections of a cover to each other to be effected, but it also permits rapid connection of other components to the cover sections.

The slots of each pair of annular end members or components are of such length that the sum of the radial dimensions of the pair of slots is greater than the radial distance between the outer periphery of the member or component formed with the outwardly directed radial slot and the inner periphery of the member or component formed with the inwardly directed radial slot.

The end members of the cover sections preferably have the same internal and external dimensions and, as can be seen from FIG. 1, each slot extends for more than half the radial distance between the inner periphery and the outer periphery of its end member.

What we claim then is:

1. First and second components to be coupled together each of which includes a body portion and a substantially planar resiliently deformable annular end member having a central aperture therein, each annular end member having an inner periphery and an outer periphery with the radial distance between the inner and outer peripheries of the first annular end member substantially equal to the radial distance between the inner and outer peripheries of the second annular end member, the first annular end member being secured to its body portion around its inner periphery and having an outwardly directed radial slot, the second annular end member being secured to its body portion around its outer periphery and formed with an inwardly directed radial slot, each of said slots including a lead-in mouth portion formed by divergence of the sides of each slot, the sum of the radial dimensions of said slots being greater than the radial distance between the outer periphery of the first annular end member and the inner periphery of the second annular end member and said components, in their coupled together condition, being arranged with the first annular end member located between the second annular end member and the second body portion and with the second annular end member located between the first annular end member and the first body portion.

2. First and second components according to claim 1 wherein each of said annular end members is formed of a polyolefine.

3. First and second components according to claim 1 wherein each body portion is corrugated and comprises a plurality of annular elements each formed of a flexible synthetic plastics material and secured together alternately around their inner and outer peripheries.

* * * * *